US012268302B2

(12) United States Patent
Cai

(10) Patent No.: US 12,268,302 B2
(45) Date of Patent: Apr. 8, 2025

(54) ASSEMBLED SHELF

(71) Applicant: Zhongshan Jiabao Daily Products Co., Ltd, Zhongshan (CN)

(72) Inventor: Shengbin Cai, Zhongshan (CN)

(73) Assignee: Zhongshan Jiabao Daily Products Co., Ltd, Zhongshan (CN)

( * ) Notice: Subject to any disclaimer, the term of this patent is extended or adjusted under 35 U.S.C. 154(b) by 0 days.

(21) Appl. No.: 18/781,471

(22) Filed: Jul. 23, 2024

(65) Prior Publication Data

US 2024/0374028 A1    Nov. 14, 2024

(30) Foreign Application Priority Data

Apr. 30, 2024  (CN) .......................... 202410539434.2

(51) Int. Cl.
*A47B 96/00*       (2006.01)
*A47B 96/02*       (2006.01)

(52) U.S. Cl.
CPC .......... *A47B 96/024* (2013.01); *A47B 96/021* (2013.01)

(58) Field of Classification Search
CPC . A47B 96/024; A47B 96/021; A47B 96/1441; A47B 57/545; A47B 57/26; A47B 57/54; A47B 2230/0077; A47B 2230/07; A47B 47/0008; A47B 47/0083
USPC ......... 108/42, 106, 107, 109, 110, 180, 187, 108/147.14, 147.17, 147.18, 155, 157.13, 108/147.13; 211/186, 187, 192; 248/250
See application file for complete search history.

(56) References Cited

U.S. PATENT DOCUMENTS

| | | | | |
|---|---|---|---|---|
| RE27,186 E | * | 10/1971 | Ferdinand et al. .... | A47B 57/44 108/107 |
| 3,638,981 A | * | 2/1972 | Weider ...................... | F16B 7/22 403/376 |
| 5,279,231 A | * | 1/1994 | Kolvites .............. | A47B 57/265 108/107 |
| 6,253,933 B1 | * | 7/2001 | Yang .................... | A47B 57/545 211/187 |
| 6,364,138 B1 | * | 4/2002 | Chen ...................... | A47B 57/26 211/187 |
| 7,191,908 B2 | * | 3/2007 | De Rijk ................. | A47B 57/48 211/208 |
| 8,505,752 B2 | * | 8/2013 | Shinozaki .............. | A47B 57/34 211/208 |

(Continued)

FOREIGN PATENT DOCUMENTS

| | | |
|---|---|---|
| CN | 111232379 A | 6/2020 |
| CN | 213308399 U | 6/2021 |

(Continued)

*Primary Examiner* — Janet M Wilkens

(57) ABSTRACT

An assembled shelf including main beams and uprights is disclosed. The main beam is detachably fixed to the upright through a shelf beam connection structure that includes a positioning hanger and a locking fastener. When assembling, a hanger body of the positioning hanger is attached to a surface of the upright, a hanging hook portion is positioned and clamped on a second side edge; then the fastening hook portion is clamped on the second side edge, the hanger body is embedded into the fastener body, and the positioning hanger positioned and clamped on the upright is tightly locked; next the main beam is connected to the locking fastener. The shelf is easy to be assembled, the stability of the assembled shelf is better.

13 Claims, 14 Drawing Sheets

(56) References Cited

U.S. PATENT DOCUMENTS

| | | | |
|---|---|---|---|
| 8,627,966 B2* | 1/2014 | Jarvis | A47B 57/545 |
| | | | 211/187 |
| 10,080,437 B1* | 9/2018 | Tang | A47B 47/0091 |
| 10,206,506 B1* | 2/2019 | Lai | A47B 96/1433 |
| 11,197,542 B2* | 12/2021 | Haimoff | A47B 87/007 |
| 2001/0004064 A1* | 6/2001 | Battaglia | A47B 87/005 |
| | | | 108/147.11 |
| 2004/0074423 A1* | 4/2004 | Burdick | A47B 47/021 |
| | | | 108/180 |
| 2005/0139562 A1* | 6/2005 | Chen | A47B 57/545 |
| | | | 211/187 |
| 2010/0108631 A1* | 5/2010 | McAllister | A47B 57/545 |
| | | | 211/187 |

FOREIGN PATENT DOCUMENTS

| | | | | |
|---|---|---|---|---|
| CN | 217147288 U | | 8/2022 | |
| CN | 220595921 U | | 3/2024 | |
| KR | 20120081366 A | * | 7/2012 | |
| WO | WO-03011075 A1 | * | 2/2003 | A47B 57/32 |

* cited by examiner

ASSEMBLED SHELF

CROSS-REFERENCE TO RELATED APPLICATIONS

The application claims priority to Chinese Patent Application No. 202410539434.2, filed on Apr. 30, 2024, the entire contents of which are incorporated herein by reference.

TECHNICAL FIELD

The present disclosure relates to the technical field of shelves, and in particular to a shelf convenient for assembly.

BACKGROUND

Shelves are often used to place goods in our daily life. In order to meet the needs of use and facilitate transportation and handling, most of the existing shelves can be detached and assembled; most of the assembled shelves on the market are mainly composed of uprights, beams, plates, connecting fixtures and snap-on locators. The two ends of the beams are fixedly connected to the uprights through snap-on locators and connecting fixtures. The snap-on locators of the existing structure are mostly composed of two pieces A and B that are matched with each other, and then a fixing member is used to fix the two together and to buckle into a slot in the upright;

In the process of assembling the shelves, a large number of the snap-on locators A and snap-on locators B are required, and each time a buckle is assembled, the corresponding snap-on locators A and snap-on locators B must be found, so the installation is more troublesome and the assembly efficiency is reduced; in addition, the fixing effect between the snap-on locators and the connecting fixtures is not satisfying, resulting in weak load-bearing capacity and stability of the shelves.

SUMMARY

The purpose of the present disclosure is to provide a conveniently assembled shelf, with the advantages of convenient and quick assembly and better stability, aiming at solving the technical problems of the existing shelf structure being inconvenient to assemble and having weak stability.

In order to solve the above technical problems, the technical solution of the present disclosure is:

A conveniently assembled shelf, includes main beams and uprights, wherein the upright has a first side edge and a second side edge opposite to each other. The main beam is detachably fixed to the upright through a shelf beam connection structure, wherein the shelf beam connection structure includes a positioning hanger and a locking fastener cooperated with each other;

The positioning hanger includes a hanger body located between the first side edge and the second side edge, the hanger body is provided with a hanging hook portion extending toward the first side edge, and the hanging hook portion can be positioned and buckled on the first side edge;

The locking fastener includes a fastener body connected to the main beam on one side, and the fastener body is detachably embedded into the hanger body on the other side, wherein the fastener body is provided with a fastening hook portion extending toward the second side edge, and the fastening hook portion can be fastened and clamped on the second side edge.

The conveniently assembled shelf as described above, the first side edge is provided with a plurality of positioning grooves at intervals along its vertical direction, and the hanging hook portion is provided with clamping blocks for matching and inserting into the positioning groove.

The conveniently assembled shelf as described above, an opening of the positioning groove faces a side away from the hanger body.

The conveniently assembled shelf as described above, a cross section of the hanging hook portion is L-shaped and can be buckled on the first side edge.

The conveniently assembled shelf as described above, a side of the hanger body facing the fastener body is provided with a plurality of vertically arranged engaged grooves, and a surface of the fastener body facing the hanger body is provided with engaging blocks for matching engaged grooves, and a top of the engaged groove is opening, allowing the engaging block to be inserted.

The conveniently assembled shelf as described above, a cross section of the engaged groove is L-shaped with a narrow notch and a wide inside, and a cross section of the engaging block is an inverted L-shaped with a narrow root and a wide outside for matching the engaged groove.

The conveniently assembled shelf as described above, a cross section of the fastening hook portion is inverted L-shaped and can be buckled on the second side edge.

The conveniently assembled shelf as described above, a side of the hanger body away from the hanging hook portion is provided with a positioning extension edge extending to the second side edge, the positioning extension edge can be laid on the second side edge, and a cross section of the fastened hook portion is inverted L-shaped and can be buckled on the positioning extension edge and the second side edge.

The conveniently assembled shelf as described above, the conveniently assembled shelf further includes secondary beams, one end of the secondary beam is detachably fixed to the main beam through a secondary shelf beam body connection structure, the main beam has a first side surface and a second side surface opposite to each other, the secondary shelf beam body connection structure includes a clamping fastener and a connecting hanger that cooperate with each other;

The snap-on fastener is detachably provided on the main beam, including a clamping body clamped on the first side surface, the clamping body is provided with a clamping hook member extending to the second side surface, the clamping hook member can be clamped on the second side surface;

One side of the connecting hanger is connected to the secondary beam, and the other side is detachably embedded with the clamping body.

The conveniently assembled shelf as described above, the first side surface is provided with a plug-in slot, and the clamping body is provided with a plug-in strip for matching and inserting into the plug-in slot.

The conveniently assembled shelf as described above, the plug-in slot includes an upper plug-in slot provided on the first side surface, an upper side wall of the upper plug-in slot is provided with a slot portion that is recessed upward, the plug-in strip includes an upper plug-in strip that can be matched and inserted in the upper plug-in slot, and the upper plug-in strip is provided with a clamp edge portion that protrudes upward to extend into the slot portion.

The conveniently assembled shelf as described above, a top plate is provided at an upper end of the main beam, the upper plug-in slot is located at a connection between the first side surface and the top plate and extends along a transverse direction, an upper convex edge is provided at an edge of the top plate and is bent downward into the upper plug-in slot, and the slot portion is formed between the upper convex edge and the first side surface.

The conveniently assembled shelf as described above, a bottom plate is provided at a lower end of the main beam, the plug-in slot includes a lower plug-in slot that is laterally provided at a connection between the first side surface and the bottom plate and is recessed inward, and the plug-in strip includes a lower plug-in strip that can be matched and inserted into the lower plug-in slot.

The conveniently assembled shelf as described above, the clamping hook member includes an extension plate extending from a lower side of the clamping body to a bottom of the main beam, and the extension plate is provided with a clamping hook foot that is tilted upward at the end away from the snap-on body, and the clamping hook foot can be fastened on the lower edge of the second side edge.

The conveniently assembled shelf as described above, a main embedding groove is arranged on a surface of the clamping body facing the connecting hanger, the main embedding groove is vertically arranged with an opening at the top, a cross section of the main embedding groove is an L-shaped with a narrow notch and a wide inside, and a main embedding block is arranged on a surface of the connecting hanger facing the clamping body, a cross section of the main embedding block is an inverted L-shaped with a narrow root and a wide outside for matching and inserting with the main embedding groove.

The conveniently assembled shelf as described above, the side of the clamping body is arranged with a side embedding groove, the side embedding groove is vertically arranged with an opening at the top, and one side of the connecting hanger is arranged with a side embedding hook extending toward the side of the clamping body, and an end of the side embedding hook away from the connecting hanger can be matched and fastened into the main embedding groove.

Compared with the prior art, the beneficial effects of the present disclosure are as follows:

1. The present disclosure provides a conveniently assembled shelf, including main beams and uprights, wherein the main beam is detachably fixed to the upright through a shelf beam connection structure, and the shelf beam connection structure includes a positioning hanger and a locking fastener that are cooperated with each other. When assembling, the hanger body of the positioning hanger is attached to a surface of the upright located between the first side edge and the second side edge, and the hanging hook portion is positioned and clamped on the second side edge, so the positioning hanger is pre-positioned on the upright. Then the fastening hook portion on the locking fastener is fastened and clamped on the second side edge, and a stable connection is formed between the positioning hanger and the locking fastener through the engagement between the hanger body and the fastener body, and the positioning hanger clamped on the upright is locked. Next, the main beam is connected to the locking fastener, and thus the main beam is detachably and firmly connected to the upright. Compared with the prior art, the present disclosure is assembled more conveniently and quickly, and the conveniently assembled shelf is more stable and practical.

2. The present disclosure also includes a secondary shelf, wherein the secondary beam is detachably fixed to the main beam through the secondary shelf beam body connection structure, and the secondary shelf beam body connection structure includes a clamping fastener and a connecting hanger that are cooperated with each other. When assembling, the clamping body is first clamped on a first side surface of the main beam, and then the clamping hook member on the clamping body is clamped on a second side surface the snap-on fastener is detachably connected to the main beam, and the connecting hanger is embedded into the snap-on fastener body to form a stable connection between the two, and then the secondary beam is connected to the other side of the connecting hanger, so the secondary beam is detachably and firmly connected to the main beam. Compared with the existing ones, the present disclosure is assembled more conveniently and quickly, and the conveniently assembled shelf is more stable and practical.

DETAILED DESCRIPTION OF THE EMBODIMENTS

Figure 1:
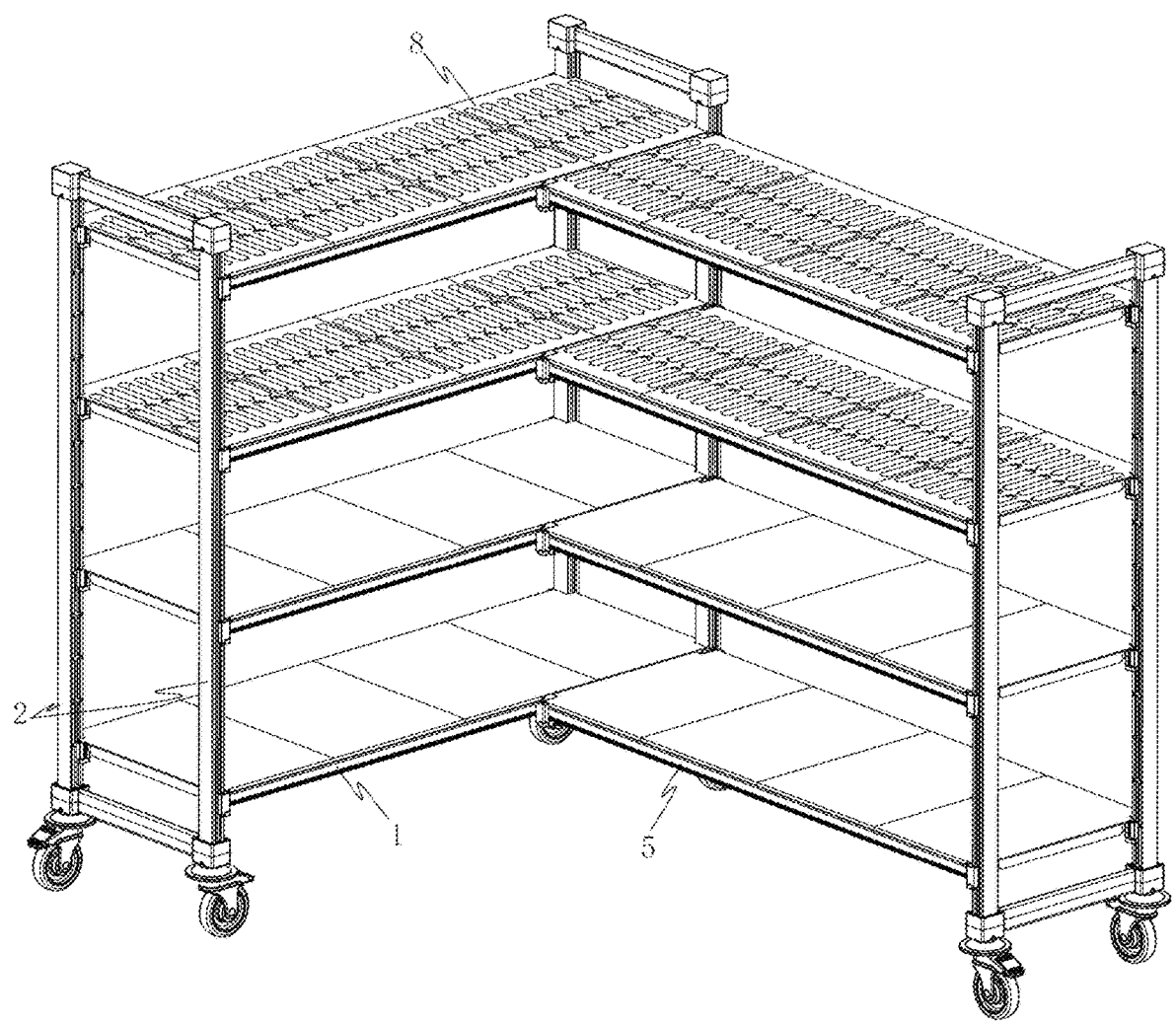
FIG. 1 is a schematic diagram of the structure of a shelf in an embodiment of the present disclosure.
Figure 2:
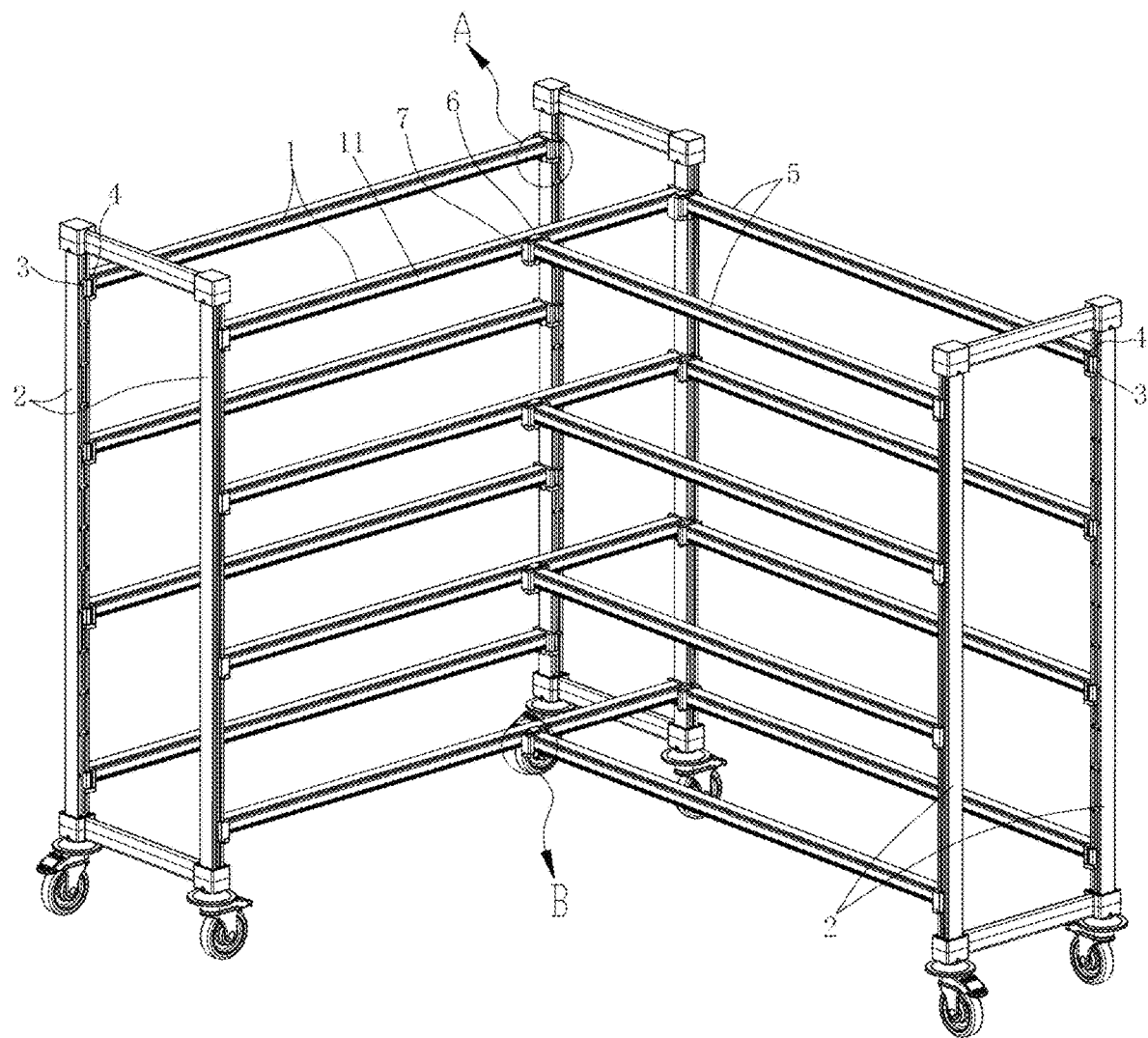
FIG. 2 is a schematic diagram of the structure of the shelf hiding layers in the embodiment of the present disclosure.
Figure 3:
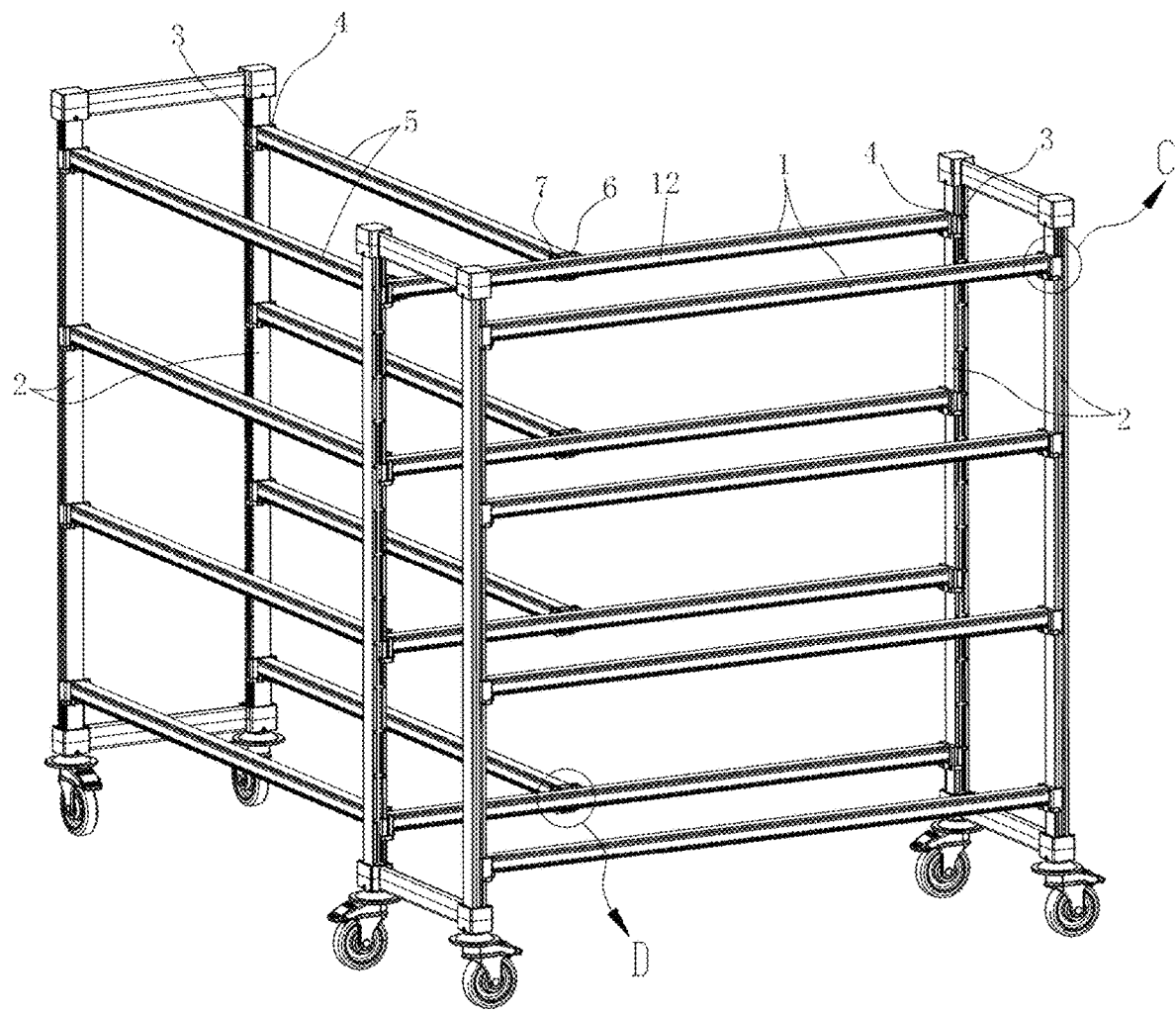
FIG. 3 is a schematic diagram of the structure of the shelf hiding layers in another perspective in the embodiment of the present disclosure.

In order to make the technical problems, technical solutions and beneficial effects solved by the present disclosure more clearly understood, the present disclosure is further described in detail below in conjunction with the accompanying drawings and embodiments. It should be known that the specific embodiments described herein are only used to explain instead of to limit the present disclosure.

As shown in FIGS. 1-14, a conveniently assembled shelf includes a main shelf, which includes at least main beams 1 and uprights 2. The upright 2 has a first side edge 21 and a second side edge 22 that are opposite to each other. The main beam 1 is detachably fixed to the upright 2 through a shelf beam body connection structure. The shelf beam connection structure includes a positioning hanger 3 and a locking fastener 4 that are cooperated with each other; the positioning hanger 3 includes a hanger body 31 located between the first side edge 21 and the second side edge 22, and the hanger body 31 is provided with a hanging hook portion 32 extending toward the first side edge 21, and the hanging hook portion 32 can be positioned and clamped on the first side edge 21; the locking fastener 4 includes a fastener body 41 connected to the main beam 1 on one side, and a fastener body 41 detachably engaged with the hanger body 31 on the other side; the fastener body 41 is provided with a fastening hook portion 42 extending toward the second side edge 22, and the fastening hook portion 42 can be fastened and clamped on the second side edge 22. When the present disclosure is assembled, the hanger body 31 of the positioning hanger 3 is attached to a surface of the upright 2 located between the first side edge 21 and the second side edge 22, and the hanging hook portion 32 is positioned and clamped on the second side edge 22, so that the positioning hanger 3 is pre-positioned on the upright 2, and then the fastening hook portion 42 on the locking fastener 4 is fastened and clamped on the second side edge 22, and the positioning hanger 3 and the locking fastener 4 are firmly connected through the engagement between the hanger body 31 and the fastener body 41, and the positioning hanger 3 positioned and clamped on the upright 2 is locked, and then the main beam 1 is connected to the locking fastener 4, so that the main beam is detachably and firmly connected to the upright. Compared with the existing ones, the assembly of the present disclosure is more convenient and quicker, and the conveniently assembled shelf is more stable and practical.

Figure 6:
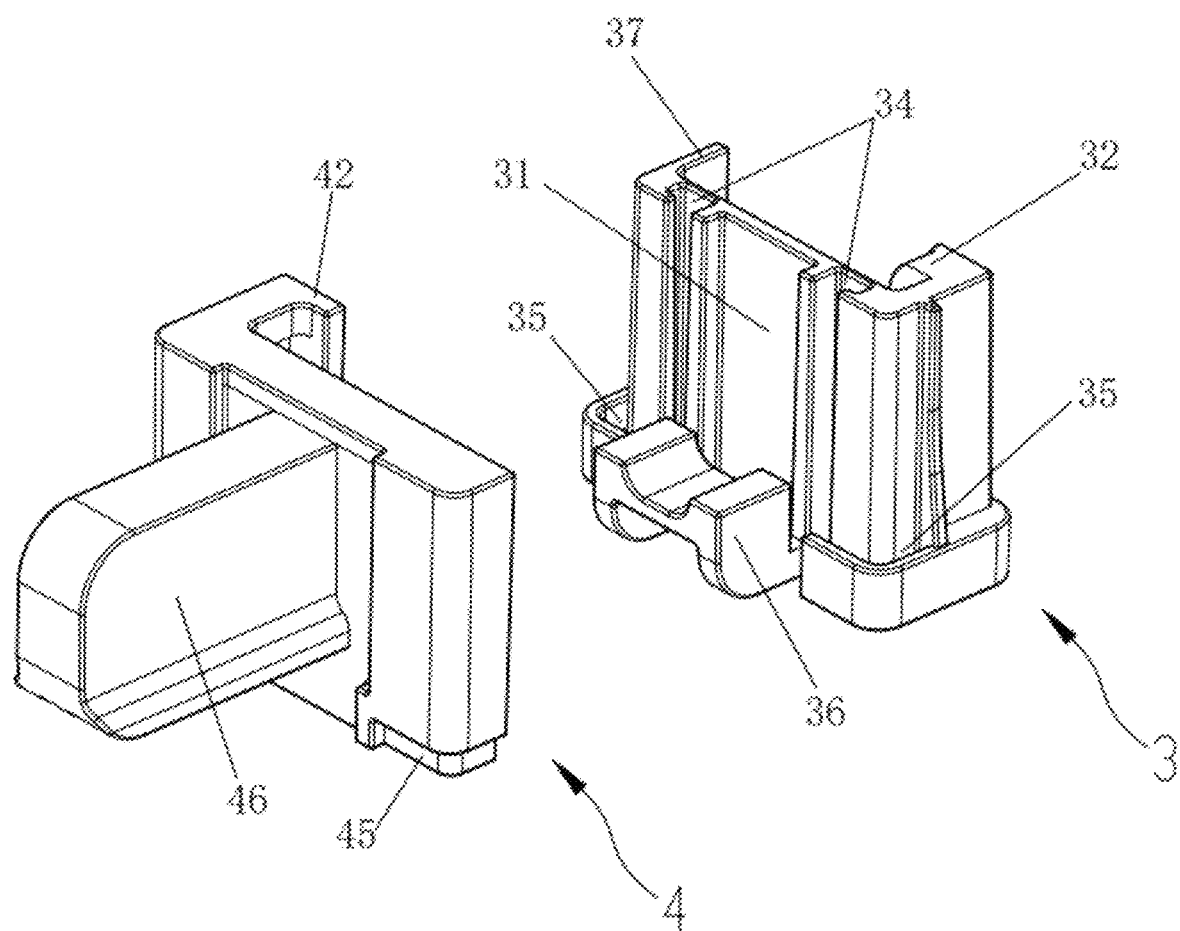
FIG. 6 is a schematic diagram of the decomposition of a shelf beam body connection structure in the embodiment of the present disclosure.
Figure 7:
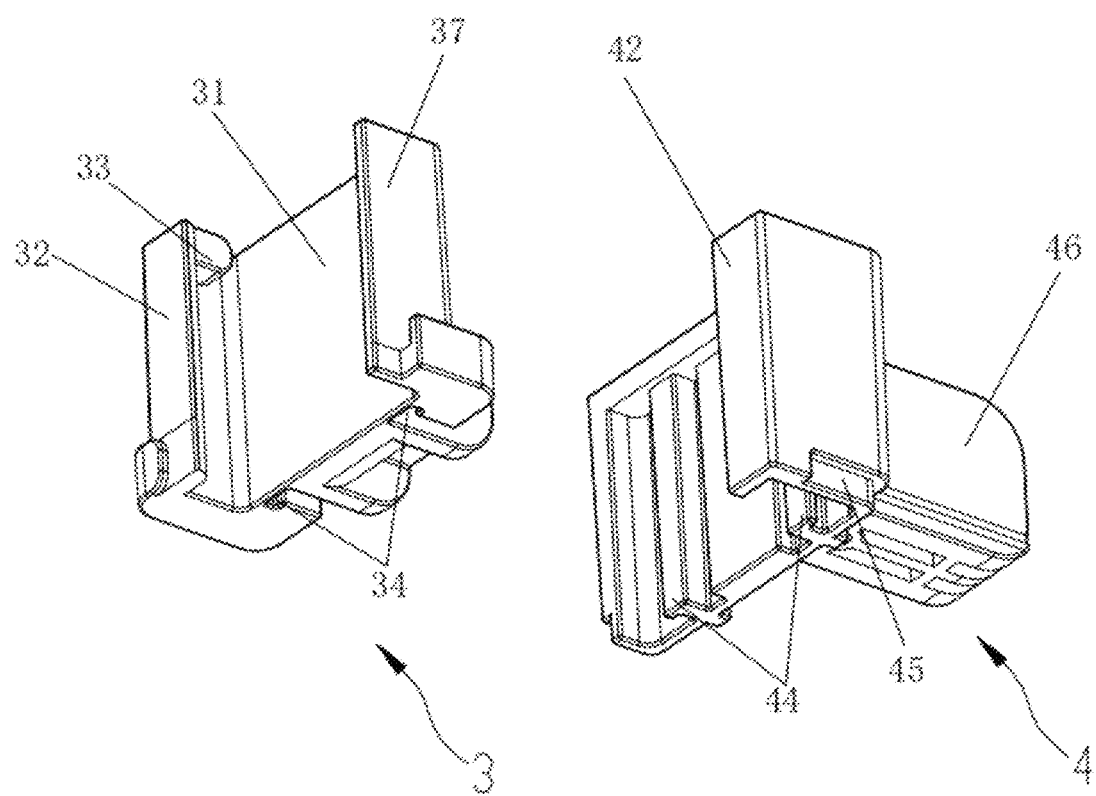
FIG. 7 is a schematic diagram of the decomposition of the shelf beam body connection structure in another perspective in the embodiment of the present disclosure.
Figure 8:
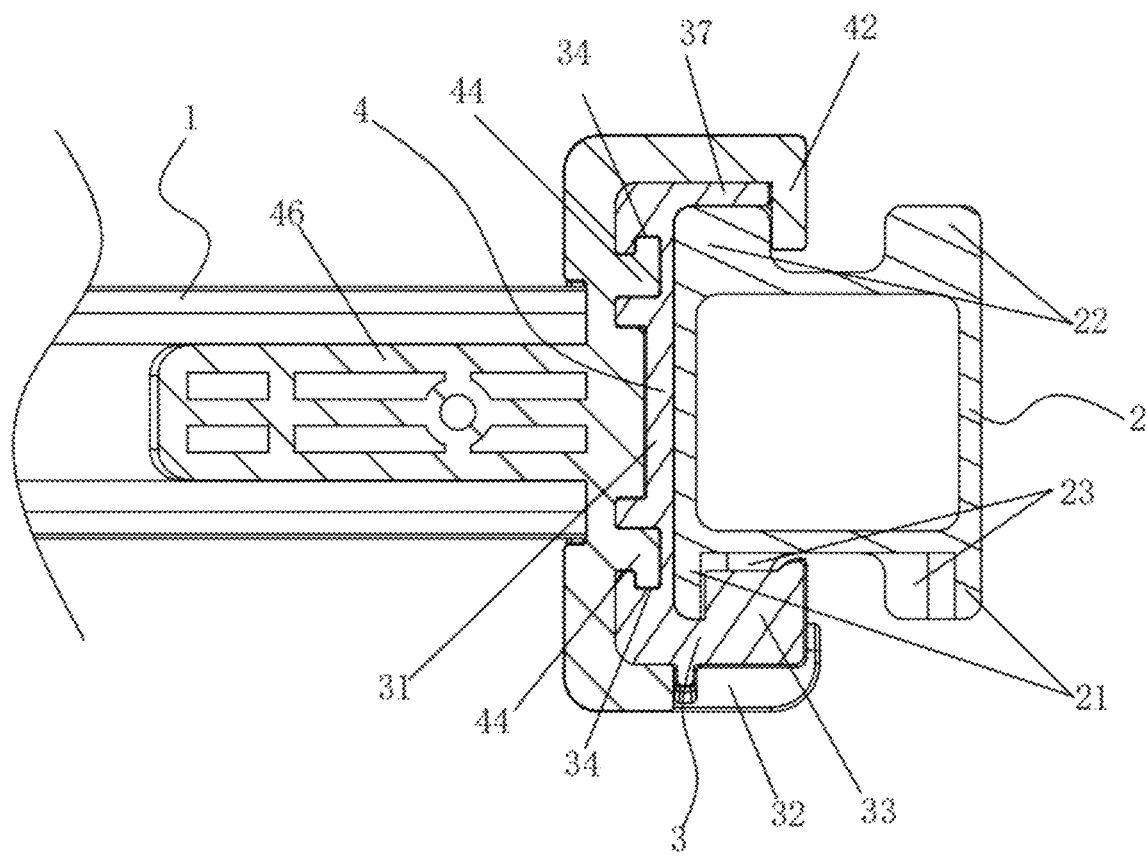
FIG. 8 is a cross-sectional schematic diagram of the shelf beam body connection structure after being assembled in the embodiment of the present disclosure.
Figure 9:
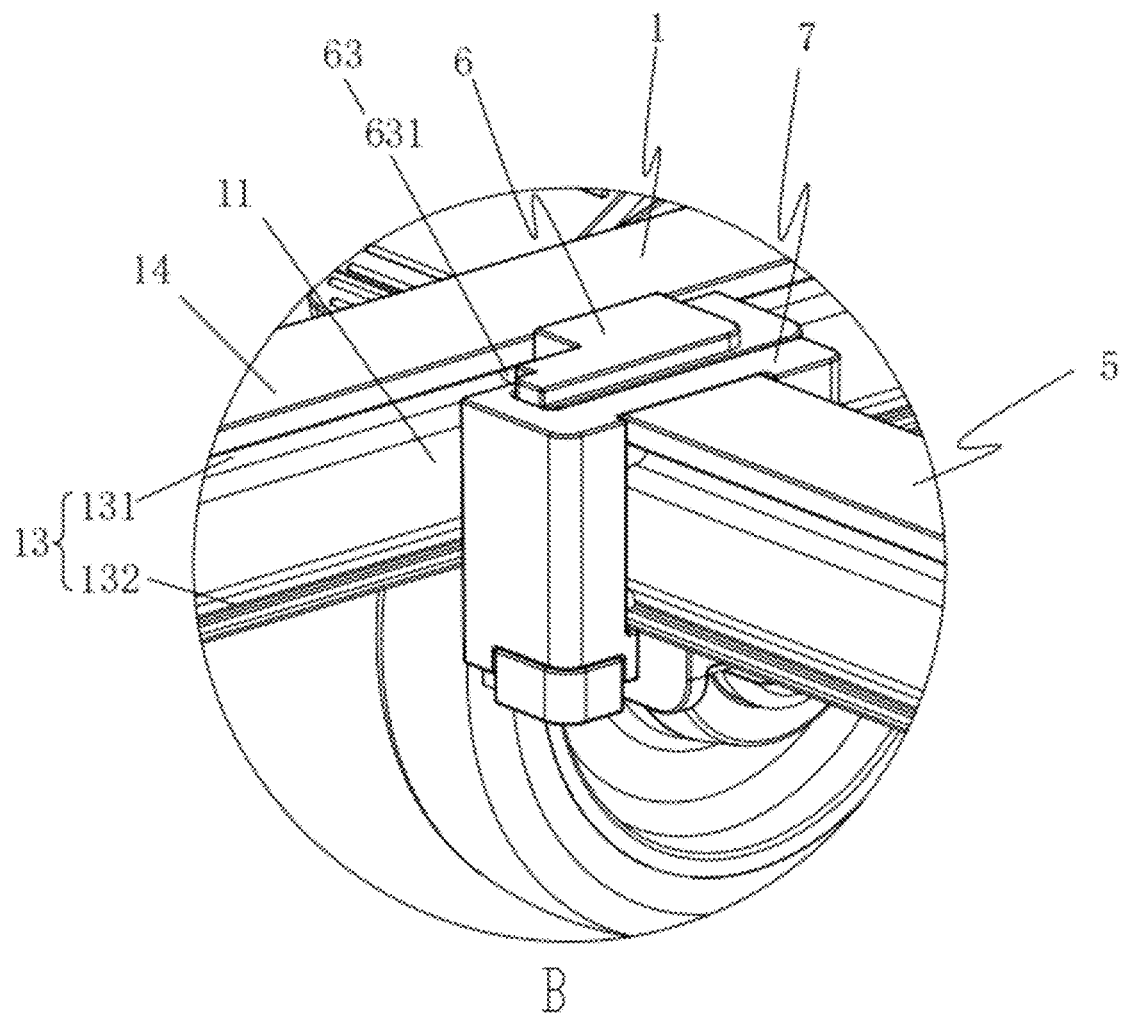
FIG. 9 is an enlarged schematic diagram of part B in FIG. 2.

Further, as shown in FIGS. 6-8, the positioning hanger 3 includes a hanger body 31 located between the first side edge 21 and the second side edge 22, the hanger body 31 is provided with a hanging hook portion 32 extending toward the first side edge 21, and the hanging hook portion 32 can be positioned and clamped on the first side edge 21. Compared with the existing assembly structure that two buckle positioning locating members for assembly, the positioning hanger 3 is configured as a whole. When assembling, the hanger body 31 is attached to a surface of the upright 2 located between the first side edge 21 and the second side edge 22, and the hook portion 32 extends to the first side edge 21 to form a positioning clamp, so that the positioning hanger 3 can be detachably hung and mounted on the upright 2. The present disclosure has the advantage of convenient assembly.

Further, as shown in FIGS. 6-8, the locking fastener 4 includes a fastener body 41 connected to the main beam 1 on one side, and the fastener body 41 detachably engaged with the hanger body 31 on the other side. The fastener body 41 is provided with a fastening hook portion 42 extending toward the second side edge 22, and the fastening hook portion 42 can be fastened and clamped on the second side edge 22. The fastener body 41 and the hanger body 31 of the present disclosure are designed to be engaged, which can improve the stability of the connection. The fastening hook portion 42 can be fastened and clamped on the second side edge 22, so the hanger body 31 embedded in the fastener body 41 can be locked through this design, and thus the locking fastener 4 and the positioning hanger 3 are fixedly connected to the upright 2. In the present disclosure, a connecting column 46 is configured to the fastener body 41 on the side away from the positioning hanger 3 and is used to being plugged into the main beam 1. With this design, the main beam 1 can be detachably and firmly connected to the upright 2.

Furthermore, as shown in FIGS. 1-4, the first side edge 21 is provided with a plurality of positioning grooves 23 at intervals along the vertical direction thereof. As shown in FIGS. 7 and 8, the hanging hooking hook 32 is provided with a fastening block 33 that is matched and clamped into the positioning groove 23. The positioning groove 23 is used to clamp the clamping block 33, so that the positioning hanger 3 can maintain a certain height. The present disclosure provides a plurality of positioning grooves 23 arranged at intervals along a vertical direction on the first side edge 21, in this way, the shelf beam body connection structure with corresponding height can be assembled according to the required height, so as to place layers 8 with different heights accordingly. Of course, the height interval between each layer 8 can also be adjusted according to the required interlayer height, which has the advantage of better adaptability.

Figure 4:
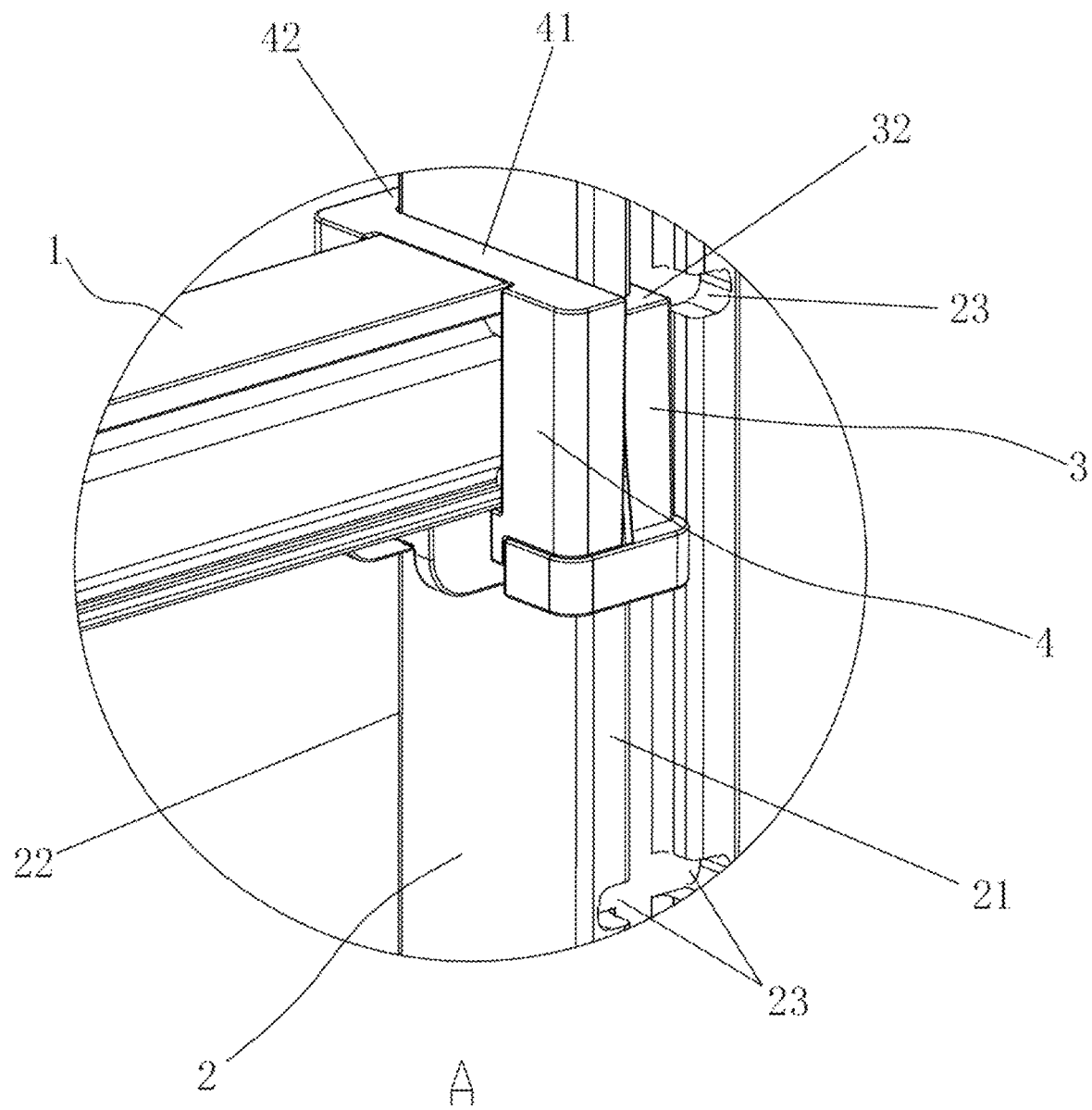
FIG. 4 is an enlarged schematic diagram of part A in FIG. 2.
Figure 5:
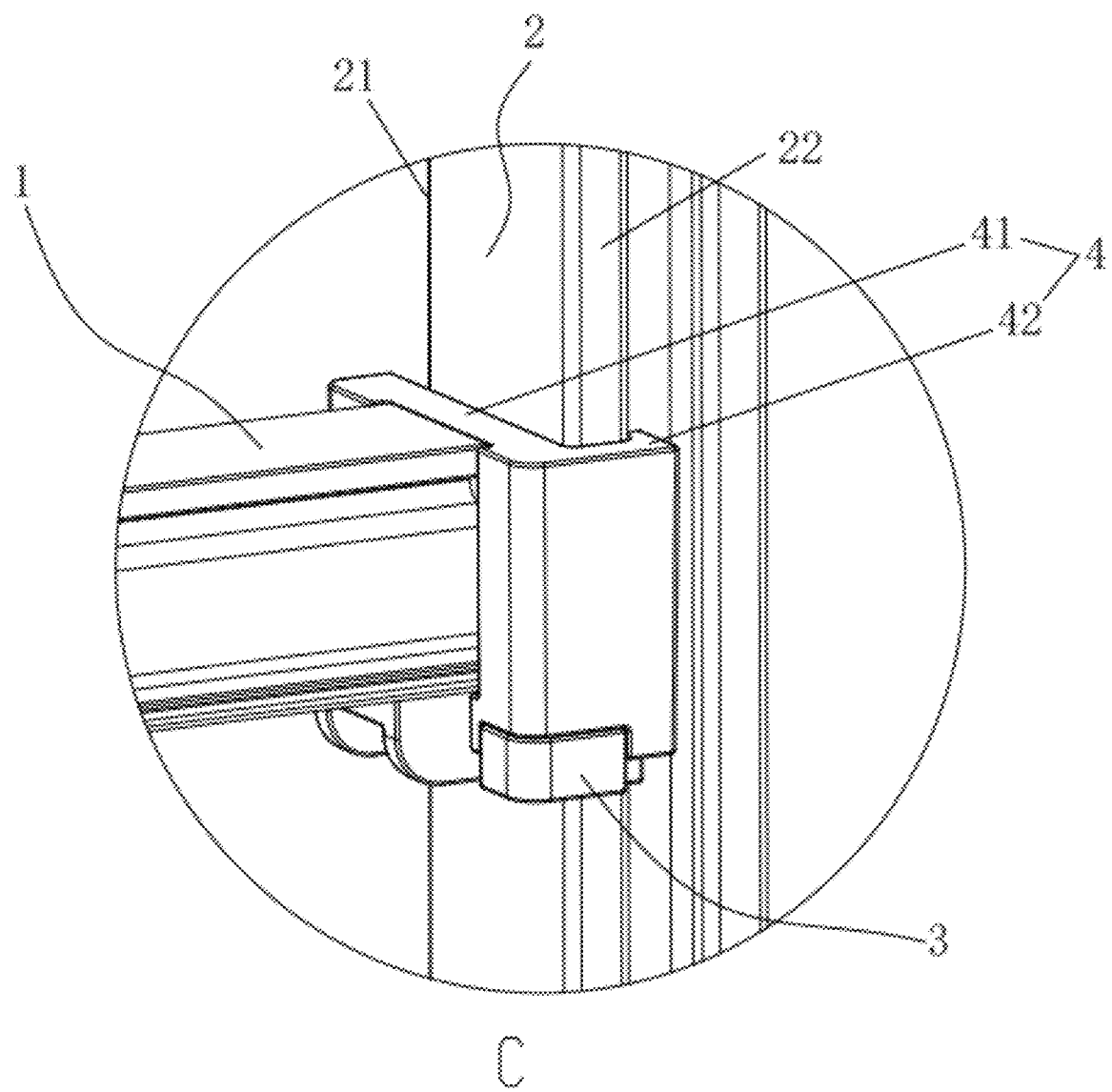
FIG. 5 is an enlarged schematic diagram of part C in FIG. 3.

Furthermore, as shown in FIG. 4, an opening of the positioning groove 23 faces to a side away from of the hanger body 31, and the first side edge 21 are provided on the edge of the same side surface of the upright 2 of the present disclosure, and the positioning grooves 23 are provided opposite to each other on a side of the two first side edge 21 close to each other. With this design, when the clamping block 33 on the positioning hanger 3 is inserted into the positioning groove 23, a lateral constraint is formed to facilitate pre-positioning.

Furthermore, as shown in FIGS. 7 and 8, a cross section of the hanging hook portion 32 is L-shaped and can be fastened on the first side edge 21, in this way, a side of the positioning hanger 3 and the first side edge 21 can be horizontally constrained, and the clamping block 33 on the hanging hook portion 32 can be inserted into the positioning groove 23 to form a vertical constraint, so that the positioning hanger 3 can be pre-positioned on the upright 2, which is convenient for the subsequent locking of the locking fastener 4.

Furthermore, as shown in FIGS. 6-8, one of the hanger body 31 and the fastener body 41 is provided with an engaged groove 34, and the other is provided with an engaging block 44 for inserting and matching with the engaged groove 34. In the present disclosure, the hanger body 31 and the fastener body 41 are connected through the engaged groove 34 and the engaging block 44, thereby improving the connection stability.

Furthermore, as shown in FIGS. 6-8, the engaged groove 34 is vertically arranged and a top portion thereof is provided with an opening for inserting the engaging block 44. When assembling, the positioning hanger 3 is first pre-positioned on the upright 2, and then the locking fastener 4 is slid downward from an upper side of the positioning hanger 3. At this time, the engaging block 44 on the hanger body 31 enters into the engaging groove 34 on the fastener body 41 to form an engagement, thereby improving the assembly stability.

Furthermore, as shown in FIGS. 6-8, the engaged grooves 34 are multiple and arranged side by side on a side of the hanger body 31 facing the fastener body 41. In the specific embodiment of the present disclosure, two engaged grooves 34 are arranged to further improve the assembly stability. A cross-section of the engaged groove 34 is L-shaped with a narrow groove opening and a wide inside. The engaging block 44 is arranged on a surface of the fastener body 41 facing the hanger body 31, and a cross-section of the engaging block 44 is an inverted L-shape with a narrow root and s wide outside for matching with the engaged groove 34. The engaged groove 34 is configured as an L-shape with a narrow groove opening and a wide inside, which can make the connection between the two more stable and improve the assembly stability.

Furthermore, as shown in FIGS. 5-8, a cross section of the fastening hook portion 42 is an inverted L-shape and can be fastened on the second side 22. When the present disclosure is assembled, the positioning hanger 3 is first pre-positioned on the upright 2, and then the fastening hook portion 42 of the locking fastener 4 is fastened to the second side edge 22, and the locking fastener 4 is slides downward from the upper side of the positioning hanger 3. At this time, the engaged block 44 on the hanger body 31 enters the engaged groove 34 on the fastener body 41 to form an engagement, and the positioning hanger 3 between the locking fastener 4 and the upright 2 is locked to improve the assembly stability.

Furthermore, a positioning extension edge 37 extending toward the second side edge 22 is provided on a side of the hanger body 31 away from the hanging hook portion 32, the positioning extension edge 37 is integrally arranged on the hanger body 31, and the positioning extension edge 37 can be laid on the second side edge 22, and a cross-section of the fastening hook portion 42 is an inverted L-shape and can be buckled on the positioning extension edge 37 and the second side edge 22. In the present disclosure, by setting the positioning extension edge 37, the hanger body 31 can be better pre-positioned on the upright 2, and when the fastening hook portion 42 is fastened on the second side edge 22, the positioning extension edge 37 can be locked together to better lock the positioning hanger 3, thereby improving the assembly stability.

Furthermore, as shown in FIGS. 6 and 7, a limiting plug-in slot 35 with an opening upward is provided on a lower side of the hanger body 31, and a bottom of the fastener body 41 is provided with a limiting protrusion 45 for inserting and matching with the limiting plug-in slot 35. In the specific embodiment of the present disclosure, two corners of a lower portion of the hanger body 31 close to a side of the fastener body 41 are provided with limiting plug-in slots 35, which can be correspondingly sleeved on the limit protrusions 45 at the two corners of a lower portion of the fastener body 41. With this design, the stability of the lower side connection between the positioning hanger 3 and the locking fastener 4 can be further improved.

Furthermore, a bottom of the hanger body 31 is provided with a limiting hook portion 36 that extends outward first and then upward. The limiting hook portion 36 is used to buckle a bottom of the locking fastener 4 when the locking fastener 4 is embedded into the hanger body 31. With this design, the stability of the lower side connection between the positioning hanger 3 and the locking fastener 4 can further improved. Another function of the limiting hook portion 36 is to support the main beam 1, making the assembly more compact.

Furthermore, the first side edge 21 and the second side edge 22 are convexly arranged on the adjacent corners of the upright 2 in a vertical strip shape respectively. More preferably, the four corners of the upright 2 are convexly provided with two groups of the first side edge 21 and the second side edge 22 respectively. The opposite surfaces of the upright 2 of the present disclosure are relatively provided with the first side edge 21 and the second side edge 22, wherein the positioning hanger 3 is clamped on the first side edge 21, the locking fastener 4 is fastened with the second side edge 22, and the positioning hanger 3 is tightly locked on the upright 2 through the locking fastener 4.

The assembly process of the shelf beam body connection structure in the embodiment is as follows: according to the required height of the interlayers, the hanging hook portion 32 on the positioning hanger 3 is first fastened on the first side edge 21. At this time, the clamping block 33 on the hanging hook portion 32 is inserted into the positioning groove 23 of the required height on the first side edge 21, and positioning hangers 3 and the uprights 2 are pre-positioned. Then, the fastening hook portion 42 of the locking fastener 4 is fastened on the second side edge 22, and the locking fastener 4 slides downward from an upper side of the positioning hanger 3. At this time, the engaging block 44 on the hanger body 31 enters the engaged groove 34 on the fastener body 41 to form an engagement, thus to tightly lock the positioning hanger 3 located between the locking fastener 4 and the upright 2. At this time, the positioning hanger 3 is in a locked state, and then the main beam 1 is connected to the other side of the locking fastener 4, and the main beam 1 is finally assembled on the upright 2.

The disassembly process of the shelf beam body connection structure in the embodiment is as follows: the locking fastener 4 is first pulled up relative to the positioning hanger 3, and the engaging block 44 on the hanger body 31 leaves the engaged groove 34 on the fastener body 41, at this time, the locking state of the positioning hanger 3 is released, the locking fastener 4 and the positioning hanger 3 can be removed from the upright 2 respectively, and the main beam 1 is disassembled from the upright 2.

Furthermore, the conveniently assembled shelf further includes a secondary shelf, which includes a plurality of secondary beams 5 and uprights 2. One end of the secondary beam 5 is detachably fixed to the main beam 1 through a secondary shelf beam body connection structure. The main beam 1 has a first side surface 11 and a second side surface 12 opposite to each other. As shown in FIGS. 9-14, the secondary shelf beam body connection structure includes a clamping fastener 6 and a connecting hanger 7 that are cooperated with each other. The clamping fastener 6 is detachably arranged on the main beam 1 including a clamping body 61 snapped on the first side surface 11, and the clamping body 61 is provided with a clamping hook member 62 extending toward the second side surface 12, and the clamping hook member 62 can be clamped on the second side surface 12. One side of the connecting hanger 7 is connected to the secondary beam 5, and the other side is detachably engaged with the clamping body 61. When the present disclosure is assembled, the clamping body 61 on the clamping fastener 6 is first clamped on the first side surface 11 of the main beam 1, then the clamping hook member 62 on the clamping body 61 is clamped on the second side surface of the main beam 1, and the clamping fastener 6 is detachably connected to the main beam 1. Next, the connecting hanger 7 is engaged with the snap body 61 to form a firm connection, then the secondary beam 5 is connected to the other side of the connecting hanger 7, and thus the secondary beam 5 is detachably and firmly connected to the main beam 1. Compared with the existing, the present disclosure is assembled more conveniently and quickly, and the stability of the conveniently assembled shelf is better and the practicability is high.

Figure 11:
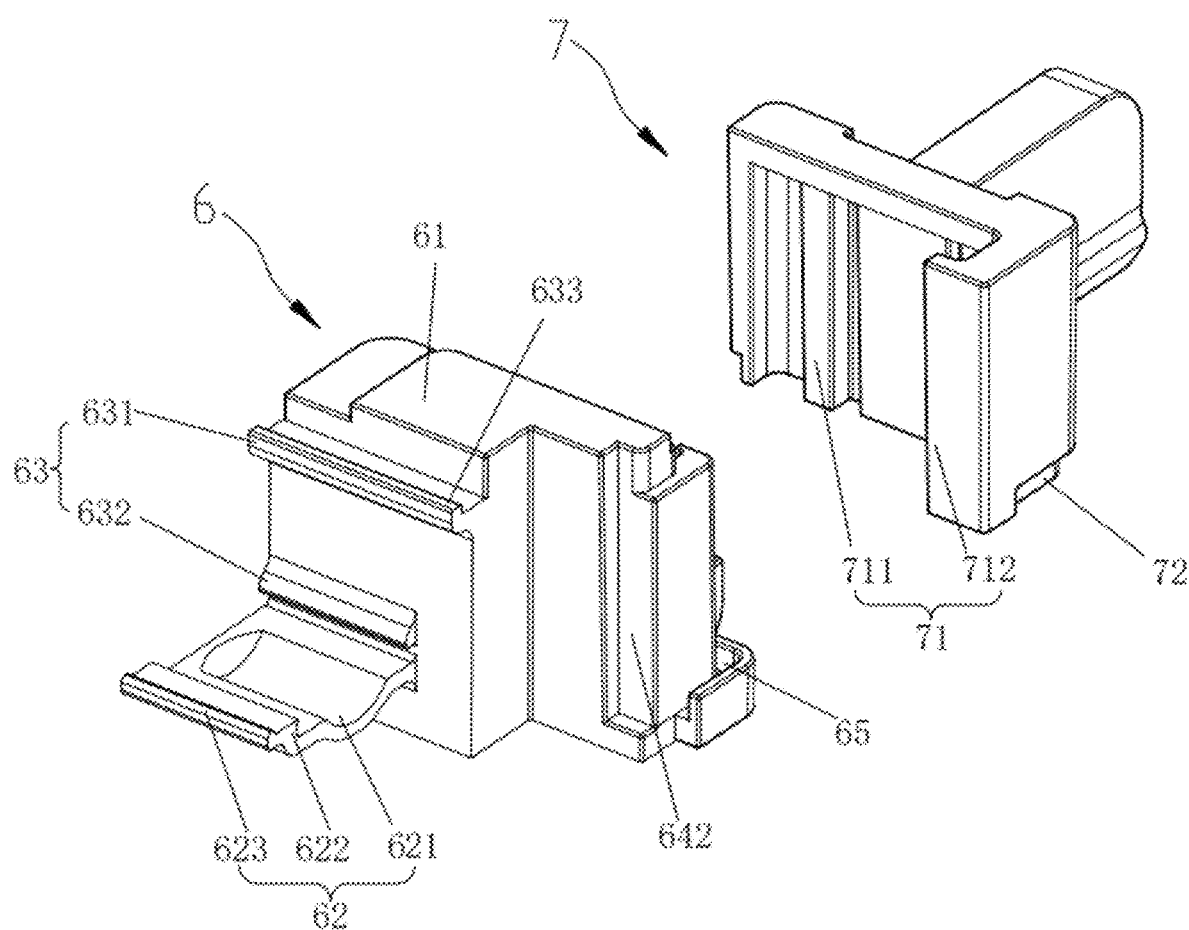
FIG. 11 is a schematic diagram of the decomposition of a secondary shelf beam body connection structure according to the embodiment of the present disclosure.
Figure 12:
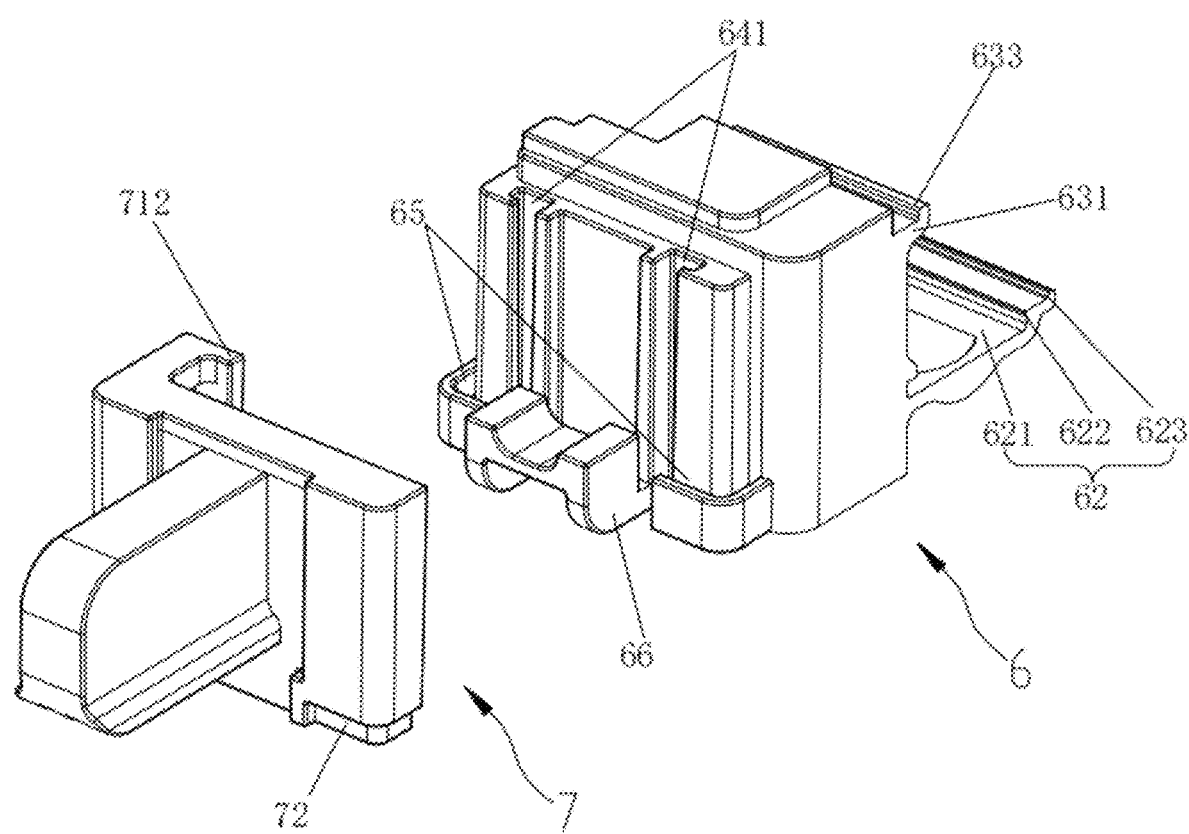
FIG. 12 is a schematic diagram of the decomposition of the secondary shelf beam body connection structure in another perspective in the embodiment of the present disclosure.
Figure 13:
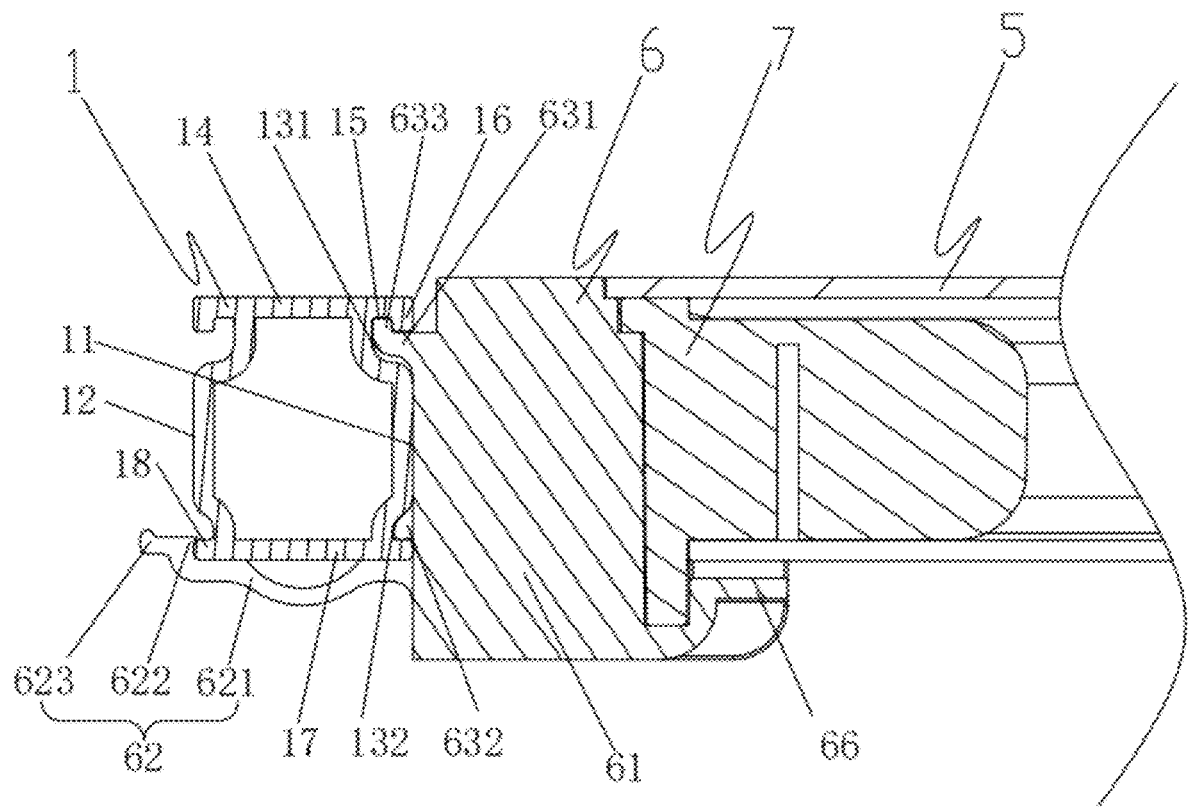
FIG. 13 is a schematic diagram of the longitudinal section of the secondary shelf beam body connection structure after being assembled in the embodiment of the present disclosure.
Figure 14:
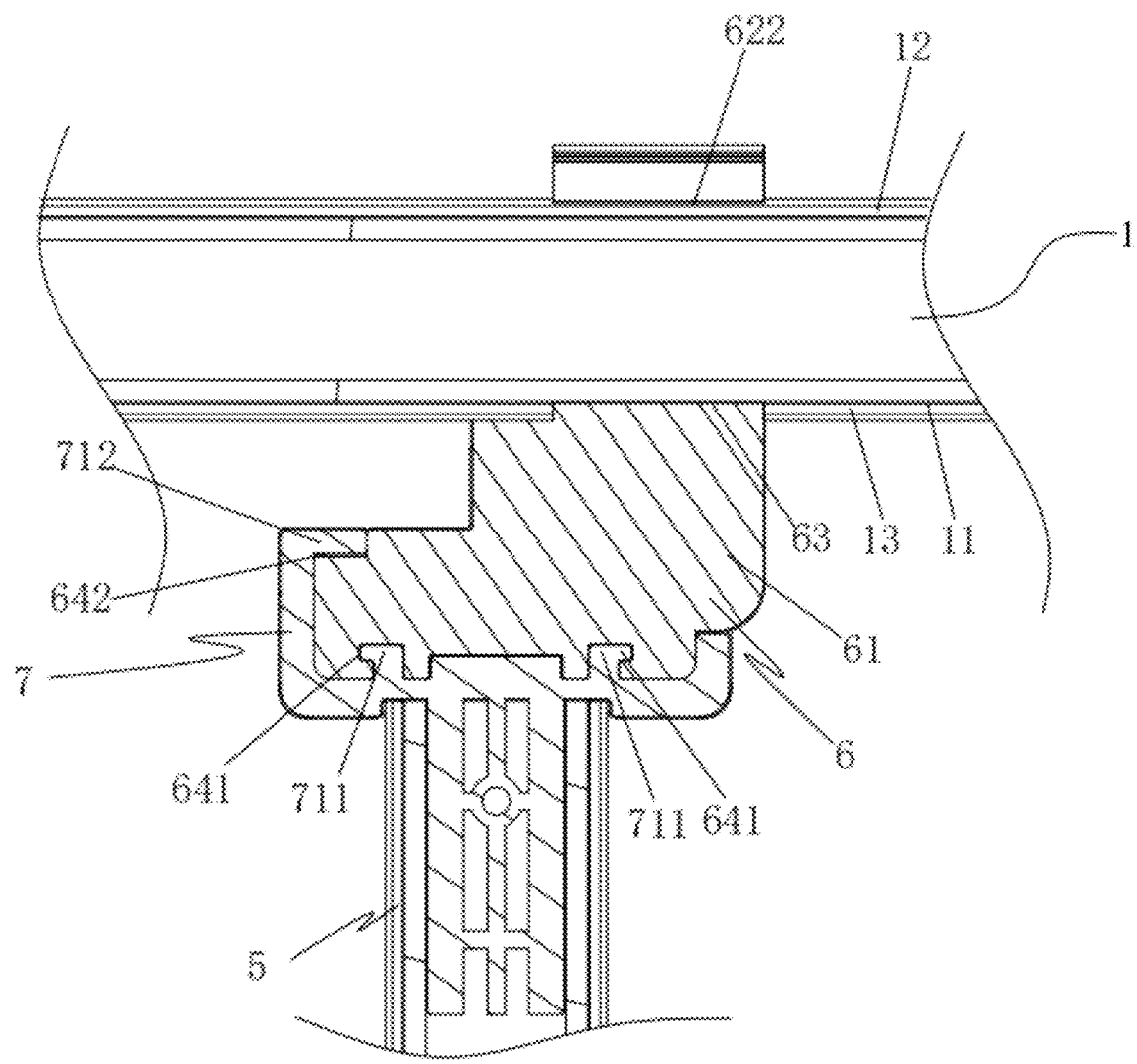
FIG. 14 is a cross-sectional schematic diagram of the assembled shelf beam body connection structure in the embodiment of the present disclosure.

Furthermore, as shown in FIGS. 11-13, the first side surface 11 is provided with a plug-in slot 13, and the clamping body 61 is provided with a plug-in strip 63 for inserting and matching with the plug-in slot 13. The clamping fastener 6 of the present disclosure and the main beam 1 are connected by means of insertion, so the assembly is more convenient, and the interlocking design increases the connection stability.

Furthermore, as shown in FIGS. 11-13, the plug-in slot 13 includes an upper plug-in slot 131 arranged on the first side surface 11, and an upper slot wall of the upper side of the upper plug-in slot 131 is provided with a slot portion 15 recessed upwardly, and the plug-in strip 63 includes an upper plug-in strip 631 that can be matched and inserted in the upper plug-in slot 131, and the upper plug-in strip 631 is provided with a clamp edge portion 633 that protrudes upward to extend into the slot portion 15. When assembling, the plug-in strip 63 is inserted into the upper slot 131, the clamp edge portion 633 is buckled into the slot portion 15 to form a snap-fit connection, and then the clamping hook member 62 is clamped on the second side surface 12 of the main beam 1, and thus the clamping fastener 6 is detachably connected to the main beam 1. The assembly stability can be improved with this design.

As a specific embodiment of the present disclosure, a top plate 14 is provided at an upper end of the main beam 1, the upper plug-in slot 131 is located at a connection between the first side surface 11 and the top plate 14 and extends along a transverse direction, and an edge of the top plate 14 is provided with an upper convex edge 16 that is bent downward into the upper plug-in slot 131, and the slot portion 15 is formed between the upper convex edge 16 and the first side surface 11. As shown in FIG. 13, in the specific embodiment of the present disclosure, the edge of the top plate 14 is bent downward to form a hook foot, which can form a stable snap-fit connection with the clamp edge portion 633 at the end of the upper plug-in strip 631, thereby improving the assembly stability.

Furthermore, a bottom plate 17 is provided at a lower end of the main beam 1, the plug-in slot 13 includes a lower plug-in slot 132 which is laterally arranged at a connection between the first side surface 11 and the bottom plate 17 and is recessed inward, and the plug-in strip 63 includes a lower plug-in strip 632 which can be matched and inserted into the lower plug-in slot 132. In the present disclosure, the first side surface 11 is provided with an upper plug-in slot 131 and a lower plug-in slot 132 laterally arranged up and down, respectively, which can provide a more stable vertical constraint, thereby further increasing the connection stability and support.

Figure 10:
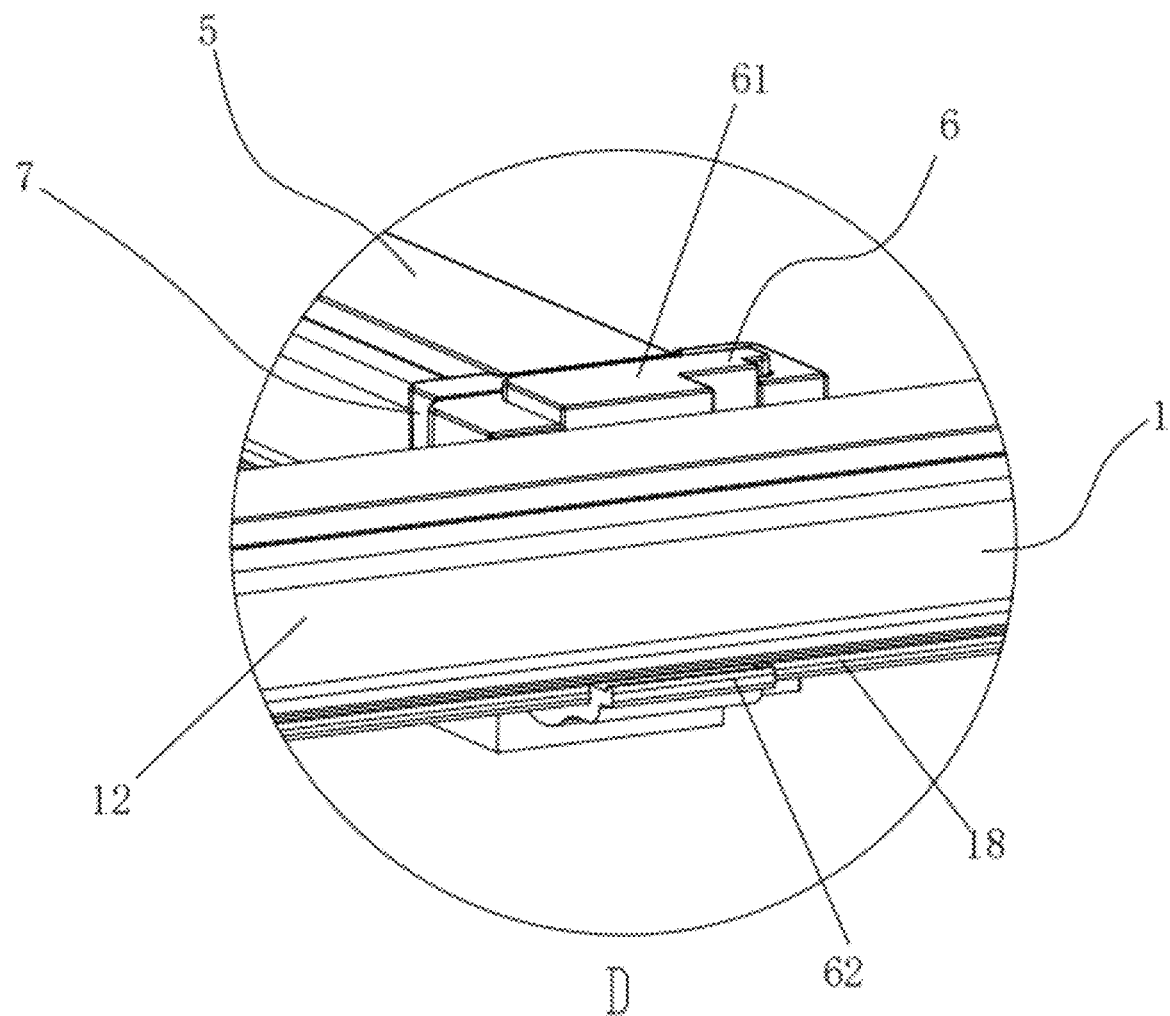
FIG. 10 is an enlarged schematic diagram of part D in FIG. 3.

Further, as shown in FIGS. 10-12, the clamping hook member 62 includes an extension plate 621 extending from a lower side of the clamping body 61 to a bottom of the main beam 1, the extension plate 621 is provided with a clamping hook foot 622 tilted upward at an end away from the clamping body 61, and the clamping hook foot 622 can be buckled to a lower edge 18 of the second side surface 12. When the present disclosure is assembled, the clamping body 61 is first clamped on the first side surface 11, and then the clamping hook member 62 is buckled to the lower edge 18 of the second side surface 12, thus to complete the assembly of the clamping fastener 6, which has the advantages of efficient and convenient assembly.

Furthermore, as shown in FIGS. 11-13, a middle portion of the extension plate 621 is a downward concave arc shape; and this design can provide the extension plate 621 a deformation buffer space, which is convenient for connecting or removing the extension plate 621 from the lower edge 18.

Furthermore, as shown in FIGS. 11-13, a rear end of the clamping hook foot 622 is provided with a disassembly protrusion 623 protruding outward, and this design is convenient for disassembly.

Furthermore, as shown in FIGS. 11-14, in the clamping body 61 and the connecting hanger 7, one of them is provided with an embedding slide groove 64, and the other is provided with an embedding slider 71 for matching and embedding into embedding slide groove 64. In the present disclosure, the clamping body 61 and the connecting hanger 7 are connected by the embedding slide groove 64 and the embedding slider 71, so as to improve the connection stability.

Furthermore, the embedding slide groove 64 includes a main embedding groove 641 provided on a surface of the clamping body 61 facing the connecting hanger 7, and the main embedding groove 641 is vertically arranged with an opening at the top. When assembling, the connecting hanger 7 is slid downwards from an upper side of the clamping fastener 6, and the embedding slider 71 on the connecting hanger 7 enters the main embedding groove 641 of the clamping fastener 6 to form a snap-fit connection, thereby improving the assembly stability.

Furthermore, a cross section of the main embedding groove 641 is an L-shape with a narrow notch and a wide inside, and the embedding slider 71 includes a main embedding block 711 provided on a surface of the connecting hanger 7 facing the clamping body 61. A cross section of the main embedding block 711 is an inverted L-shape with a narrow root and a wide inside that is matched the inserted into the main embedding groove 641. By setting the main embedding groove 641 as an L-shape with a narrow notch and a wide inside can make the connection between the two more stable and improve the assembly stability.

Furthermore, the embedding slide groove 64 includes a side embedding groove 642 provided on a side surface of the clamping body 61, and the side embedding groove 642 is a vertically arranged with an opening at the top. The embedding slider 71 includes a side embedding hook 712 provided on a side of the connecting hanger 7 and extended toward a side surface of the clamping body 61, and an end of the side embedding hook 712 away from the connecting hanger 7 can be matched and buckled into the side embedding groove 642. When assembling, the connecting hanger 7 is slid downward from the upper side of the clamping fastener 6, and the embedding slider 71 on the connecting hanger 7 enters the side embedding groove 642 of the clamping fastener 6 to form a side snap-fit connection, thereby improving the assembly stability.

Further, as shown in FIGS. 11-12, a lower side of the clamping body 61 is provided with a limit embedding groove 65 with an opening facing upward, and a bottom of the connecting hanger 7 is provided with a clamping protrusion 72 for inserting and matching with the limit embedding groove 65. In the specific embodiment of the present disclosure, two corners at a lower part on a side of the clamping body 61 close to the connecting hanger 7 are provided with limit embedding grooves 65, which can be correspondingly sleeved on the clamping protrusions 72 at two corners at a lower part of the connecting hanger 7. With this design, the connection stability at the lower side of the clamping fastener 6 and the connecting hanger 7 can be further improved.

A bottom of the clamping body 61 is provided with a limit clamping hook 66 which first extends outward and then extends upward. The limit clamping hook 66 is used to fasten the bottom of the connecting hanger 7 when the connecting hanger 7 is embedded into the clamping body 61. With this design, the connection stability at the lower side of the clamping fastener 6 and the connecting hanger 7 can be further improved. Another function of the limiting hook portion 36 is to support the secondary beam 5, so that the assembly is more compact.

The assembly process of the secondary shelf beam body connection structure in the embodiment is as follows: according to the required installation position, the plug-in strip 63 on the clamping fastener 6 is inserted into the plug-in slot 13 on the first side surface 11 of the main beam 1, and the clamping hook member 62 on the clamping fastener 6 is buckled on the lower edge 18 on the second side surface 12 of the main beam 1, so the clamping fastener 6 is installed on the main beam 1. Then the connecting hanger 7 is slid downward from an upper side of the clamping fastener 6, at this time, the main embedding block 711 on the front of the connecting hanger 7 slides into the main embedding groove 641 on the front of the clamping body 61 to form an embedment connection, and the side embedding hook 712 on the side surface of the connecting hanger 7 slides into the side embedding groove 642 on the side surface of the clamping body 61 to form a snap-fit connection, and next the secondary beam 5 is connected to the other side of the connecting hanger 7, and thus the secondary beam 5 is assembled on the main beam 1.

The disassembly process of the secondary shelf beam body connection structure in the embodiment is as follows: the connecting hanger 7 is pulled up relative to the clamping fastener 6, the main embedding block 711 and the side embedding hook 712 of the connecting hanger 7 are removed from the main embedding groove 641 and the side embedding groove 642 on the clamping body 61 respectively, the connecting hanger 7 is removed from the clamping fastener 6, and then the disassembly protrusion 623 on the clamping hook member 62 is pressed downward, so that the clamping hook foot 622 on the clamping hook member 62 is removed from the lower edge 18 of the second side surface 12, at this time, the clamping fastener 6 is removed from the main beam 1, thus the secondary beam 5 is removed from the main beam 1.

Furthermore, the other end of the secondary beam 5 is detachably assembled on the upright 2 through the above-mentioned structure. When assembling, the positioning hanger 3 is first positioned and clamped on the first side edge 21, so the positioning hanger 3 is pre-positioned on the upright 2, and then the locking fastener 4 is buckled on the second side edge 22. The locking fastener 4 is embedded into the positioning hanger 3, to form a stable connection between the two, and the positioning hanger 3 positioned and clamped on the upright 2 is tightly locked. Next the secondary beam 5 is connected to the locking fastener 4, thus the secondary beam 5 is detachably and firmly connected to the upright 2. Compared with the existing ones, the present disclosure is assembled more conveniently and quickly, the stability of the conveniently assembled shelf is better and the practicability is high.

The above is a preferred embodiment of the present disclosure. It should be pointed out that for ordinary technicians in this technical field, several improvements and deformations can be made without departing from the principle of the present disclosure, and these improvements and deformations are also regarded as the protection scope of the present disclosure.

What is claimed is:

1. An assembled shelf, comprising at least one main beam and at least one upright, the upright having a first side edge and a second side edge opposite to each other,
   wherein the main beam is detachably fixed to the upright through a shelf beam body connection structure that includes a positioning hanger and a locking fastener cooperated with each other;
   the positioning hanger is detachably arranged on the upright, and positioned and clamped on the first side edge;
   one side of the locking fastener is connected to the main beam, and the other side is detachably embedded with the positioning hanger, and the locking fastener is buckled on the second side edge for tightly locking the positioning hanger positioned and clamped on the first side edge,
   wherein the positioning hanger includes a hanger body located between the first side edge and the second side edge, a hanging hook portion extending toward the first side edge is configured on the hanger body, and the hanging hook portion is positioned and buckled on the first side edge,
   wherein multiple positioning grooves at intervals are configured on the first side edge along its vertical direction, and a plurality of clamping blocks are configured on the hanging hook portion for matching and inserting into the positioning grooves,
   wherein the locking fastener includes a fastener body with one side connected to the main beam and the other side detachably embedded with the hanger body, a fastening hook portion extending toward the second side edge is configured on the fastener body, and the fastening hook portion is fastened and clamped on the second side edge,
   wherein a plurality of engaging grooves arranged vertically are configured on a side surface of the hanger body facing the fastener body, and engaging blocks are configured on a surface of the fastener body facing the hanger body for matching and inserting into the engaging grooves, and a top of the engaging groove is an opening that allows insertion of the engaging block,
   wherein a cross section of the engaging groove is an L-shape with a narrow groove opening and a wide inside, and a cross section of the engaging block is an inverted L-shape with a narrow root and a wide inside for matching the engaging groove.

2. The assembled shelf according to claim 1, wherein an opening of the positioning groove faces a side away from the hanger body.

3. The assembled shelf according to claim 1, wherein a cross section of the hanging hook portion is L-shape and is buckled on the first side edge.

4. The assembled shelf according to claim 1, wherein a cross section of the fastening hook portion is an inverted L-shape and is buckled on the second side edge.

5. The assembled shelf according to claim 1, wherein a positioning extension edge extending toward the second side edge is configured at a side of the hanger body away from the hanging hook portion, and the positioning extension edge is placed on the second side edge.

6. The assembled shelf according to claim 5, wherein a cross section of the fastening hook portion is an inverted L-shape and is buckled on the positioning extension edge and the second side edge.

7. An assembled shelf, comprising at least one main beam and at least one upright, the upright having a first side edge and a second side edge opposite to each other,
- wherein the main beam is detachably fixed to the upright through a shelf beam body connection structure that includes a positioning hanger and a locking fastener cooperated with each other;
- the positioning hanger is detachably arranged on the upright, and positioned and clamped on the first side edge;
- one side of the locking fastener is connected to the main beam, and the other side is detachably embedded with the positioning hanger, and the locking fastener is buckled on the second side edge for tightly locking the positioning hanger positioned and clamped on the first side edge,
- wherein the assembled shelf further comprises a secondary beam with one end detachably fixed to the main beam through a secondary shelf beam body connection structure,
- wherein the main beam has a first side surface and a second side surface opposite to each other, and the secondary shelf beam body connection structure includes a clamping fastener and a connecting hanger that cooperate with each other;
- the clamping fastener is detachably arranged on the main beam and includes a clamping body clamped to the first side surface, and a clamping hook member extending toward the second side surface is configured on the clamping body, and the clamping hook member is fastened to the second side surface;
- one side of the connecting hanger is connected to the secondary beam, and the other side is detachably embedded with the clamping body,
- wherein at least a plug-in slot is configured on the first side surface, and at least a plug-in strip for matching and inserting into the plug-in slot is configured on the clamping body.

8. The assembled shelf according to claim 7, wherein the plug-in slot includes an upper plug-in slot arranged on the first side surface, a slot portion recessed upward is configured at a slot wall of an upper side of the upper plug-in slot, the plug-in strip includes an upper plug-in strip that is matched and inserted in the upper plug-in slot, and a clamp edge portion protruding upwardly to extend into the slot portion is configured on the upper plug-in strip.

9. The assembled shelf according to claim 8 is wherein a top plate is configured at an upper end of the main beam, the upper plug-in slot is located at a connection between the first side surface and the top plate and extends along a transverse direction, and an upper convex edge is configured on an edge of the top plate and is bent downward into the upper plug-in slot, and the slot portion is formed between the upper convex edge and the first side surface.

10. The assembled shelf according to claim 8 is wherein a bottom plate is configured at a lower end of the main beam, the plug-in slot includes a lower plug-in slot that is laterally configured at a connection between the first side surface and the bottom plate and is recessed inward, and the plug-in strip includes a lower plug-in strip which is matched and inserted into the lower plug-in slot.

11. The assembled shelf according to claim 7, wherein the clamping hook member includes an extension plate extending from a lower side of the clamping body to a bottom of the main beam, and a clamping hook foot tilted upward is configured at an end portion of the extension plate away from the clamping body, and the clamping hook foot can be fastened on the lower edge of the second side surface.

12. The assembled shelf according to claim 7, wherein a main embedding groove is configured at the clamping body on a surface facing the connecting hanger, the main embedding groove is vertically arranged with an opening at the top, and a cross section of the main embedding groove is an L-shape with a narrow notch and a wide inside; a main embedding block is arranged on a surface of the connecting hanger facing the clamping body, and a cross section of the main embedding block is an inverted L-shape with a narrow root and a wide outside for matching the main embedding groove.

13. The assembled shelf according to claim 12, wherein a side embedding groove is configured on a side surface of the clamping body, and the side embedding groove is vertically arranged with an opening at the top; a side embedding hook extending toward a side of the clamping body is arranged on a side of the connecting hanger, and an end of the side embedding hook away from the connecting hanger can be matched and buckled into the main embedding groove.

* * * * *